(12) United States Patent
Anderson et al.

(10) Patent No.: US 11,704,209 B2
(45) Date of Patent: *Jul. 18, 2023

(54) USING A TRACK FORMAT CODE IN A CACHE CONTROL BLOCK FOR A TRACK IN A CACHE TO PROCESS READ AND WRITE REQUESTS TO THE TRACK IN THE CACHE

(71) Applicant: INTERNATIONAL BUSINESS MACHINES CORPORATION, Armonk, NY (US)

(72) Inventors: Kyler A. Anderson, Sahuarita, AZ (US); Kevin J. Ash, Tucson, AZ (US); Lokesh M. Gupta, Tucson, AZ (US); Matthew J. Kalos, Tucson, AZ (US); Beth A. Peterson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/649,797

(22) Filed: Feb. 2, 2022

(65) Prior Publication Data

US 2022/0156166 A1     May 19, 2022

Related U.S. Application Data

(63) Continuation of application No. 16/836,827, filed on Mar. 31, 2020, now Pat. No. 11,263,097, which is a
(Continued)

(51) Int. Cl.
*G06F 11/20* (2006.01)
*G06F 12/0871* (2016.01)
(Continued)

(52) U.S. Cl.
CPC ...... *G06F 11/2092* (2013.01); *G06F 11/2007* (2013.01); *G06F 11/2012* (2013.01);
(Continued)

(58) Field of Classification Search
CPC ............. G06F 11/3037; G06F 11/1064; G06F 11/2012; G06F 11/2007; G06F 12/123;
(Continued)

(56) References Cited

U.S. PATENT DOCUMENTS 5,600,816 A  2/1997 Oldfield et al.
5,636,359 A  6/1997 Beardsley et al.
(Continued)

FOREIGN PATENT DOCUMENTS

CN  103197899 A  *  7/2013  ......... G06F 12/0246
CN  103562843 A     2/2014
(Continued)

OTHER PUBLICATIONS

Anonymously; "A Systematic Framework for Managing Data Rules at Scale: For Big Data, The Cloud, and Beyond"; http://ip.com/IPCOM/000242035D; Jun. 15, 2015.
(Continued)

*Primary Examiner* — Yolanda L Wilson
(74) *Attorney, Agent, or Firm* — Konrad Raynes Davda & Victor LLP; David W. Victor

(57) ABSTRACT

Provided are a computer program product, system, and method for using a track format code in a cache control block for a track in a cache to process read and write requests to the track in the cache. A track format table associates track format codes with track format metadata. A determination is made as to whether the track format table has track format metadata matching track format metadata of a track staged into the cache. A determination is made as to whether a track format code from the track format table for the track format
(Continued)

metadata in the track format table matches the track format metadata of the track staged. A cache control block for the track being added to the cache is generated including the determined track format code when the track format table has the matching track format metadata.

20 Claims, 6 Drawing Sheets

Related U.S. Application Data continuation of application No. 15/662,194, filed on Jul. 27, 2017, now Pat. No. 10,691,566.

(51) Int. Cl.
 *G06F 12/123* (2016.01)
 *G06F 12/0842* (2016.01)
 *G06F 11/07* (2006.01)

(52) U.S. Cl.
 CPC ...... *G06F 12/0842* (2013.01); *G06F 12/0871* (2013.01); *G06F 12/123* (2013.01); *G06F 11/0757* (2013.01); *G06F 2201/805* (2013.01); *G06F 2201/81* (2013.01); *G06F 2212/1024* (2013.01); *G06F 2212/313* (2013.01); *G06F 2212/462* (2013.01); *G06F 2212/466* (2013.01); *G06F 2212/601* (2013.01)

(58) Field of Classification Search
 CPC ............. G06F 12/0871; G06F 12/0842; G06F 11/1435; G06F 12/0866; G06F 2212/462; G06F 2212/466
 See application file for complete search history.

(56) References Cited

U.S. PATENT DOCUMENTS

| | | |
|---|---|---|
| 5,724,501 A | 3/1998 | Dewey et al. |
| 6,029,229 A | 2/2000 | Vishlitzky |
| 6,216,199 B1* | 4/2001 | DeKoning .......... G06F 12/0864 711/3 |
| 6,314,490 B1 | 11/2001 | Morein |
| 6,425,051 B1 | 7/2002 | Burton et al. |
| 6,438,661 B1* | 8/2002 | Beardsley ........... G06F 11/1435 711/144 |
| 6,715,030 B1* | 3/2004 | Vandenbergh ........ G06F 3/0653 711/170 |
| 6,832,290 B2 | 12/2004 | Todd |
| 6,928,526 B1 | 8/2005 | Zhu et al. |
| 7,139,933 B2 | 11/2006 | Hsu et al. |
| 7,434,002 B1 | 10/2008 | Zedlewski et al. |
| 8,027,952 B2 | 9/2011 | Kern et al. |
| 8,332,581 B2 | 12/2012 | Candelaria et al. |
| 8,606,767 B2 | 12/2013 | Brown et al. |
| 8,676,748 B2 | 3/2014 | Budaya |
| 8,745,325 B2 | 6/2014 | Benhase et al. |
| 8,788,742 B2 | 7/2014 | Benhase et al. |
| 8,806,122 B2 | 8/2014 | Benhase et al. |
| 8,825,973 B2 | 9/2014 | Ash et al. |
| 8,825,975 B2 | 9/2014 | Ash et al. |
| 8,959,279 B2 | 2/2015 | Ash et al. |
| 8,966,178 B2 | 2/2015 | Ash et al. |
| 9,032,169 B2 | 5/2015 | Eastman |
| 9,104,552 B1 | 8/2015 | Bolt |
| 9,298,567 B2 | 3/2016 | Blea et al. |
| 9,317,207 B2 | 4/2016 | Hu et al. |
| 9,489,389 B2 | 11/2016 | Patil et al. |
| 9,582,421 B1 | 2/2017 | Agarwala et al. |
| 10,158,894 B2 | 12/2018 | Nair |
| 10,223,274 B1 | 3/2019 | Anderson et al. |
| 10,579,532 B2 | 3/2020 | Anderson et al. |
| 10,691,566 B2 | 6/2020 | Anderson et al. |
| 10,884,936 B2 | 1/2021 | Gupta et al. |
| 10,936,117 B2 | 8/2021 | Anderson et al. |
| 2003/0131163 A1 | 7/2003 | Ishii et al. |
| 2003/0177130 A1 | 9/2003 | Todd |
| 2004/0250022 A1 | 12/2004 | Jarvis et al. |
| 2004/0267706 A1 | 12/2004 | Springer, Sr. et al. |
| 2006/0080510 A1 | 4/2006 | Benhase et al. |
| 2007/0245099 A1 | 10/2007 | Gray et al. |
| 2008/0120482 A1 | 5/2008 | Jarvis et al. |
| 2008/0126913 A1* | 5/2008 | Benhanokh ......... G06F 11/1435 714/763 |
| 2008/0256286 A1 | 10/2008 | Ash |
| 2011/0191522 A1 | 8/2011 | Condict et al. |
| 2012/0102078 A1 | 4/2012 | Flick et al. |
| 2012/0260043 A1 | 10/2012 | Benhase et al. |
| 2012/0303862 A1 | 11/2012 | Benhase et al. |
| 2013/0185489 A1 | 7/2013 | Benhase et al. |
| 2013/0185493 A1 | 7/2013 | Benhase et al. |
| 2013/0185504 A1 | 7/2013 | Ash et al. |
| 2013/0204854 A1 | 8/2013 | Brown et al. |
| 2014/0115261 A1 | 4/2014 | Maybee et al. |
| 2014/0258628 A1 | 9/2014 | Shivashankaraiah et al. |
| 2014/0325145 A1 | 10/2014 | Sampathkumar |
| 2015/0012690 A1 | 1/2015 | Bruce et al. |
| 2015/0178207 A1* | 6/2015 | Susarla ............... G06F 11/3055 711/146 |
| 2015/0286432 A1 | 10/2015 | Dain et al. |
| 2015/0309892 A1 | 10/2015 | Ramasubramaniam et al. |
| 2016/0085460 A1* | 3/2016 | Chandrashekar ..... G06F 3/0617 711/130 |
| 2016/0140053 A1 | 5/2016 | Ash et al. |
| 2016/0232102 A1 | 8/2016 | Ash et al. |
| 2017/0052822 A1 | 2/2017 | Ash et al. |
| 2017/0111468 A1 | 4/2017 | Ash et al. |
| 2017/0124001 A1 | 5/2017 | Ash et al. |
| 2017/0206028 A1 | 7/2017 | O et al. |
| 2017/0286210 A1 | 10/2017 | Yigzaw et al. |
| 2019/0034302 A1 | 1/2019 | Anderson et al. |
| 2019/0034303 A1 | 1/2019 | Anderson et al. |
| 2019/0034304 A1 | 1/2019 | Anderson et al. |
| 2019/0034355 A1 | 1/2019 | Anderson et al. |
| 2019/0042096 A1 | 2/2019 | Anderson et al. |
| 2019/0050339 A1 | 2/2019 | Anderson et al. |
| 2019/0050340 A1 | 2/2019 | Anderson et al. |
| 2019/0073279 A1 | 3/2019 | Anderson et al. |
| 2020/0151105 A1 | 5/2020 | Anderson et al. |
| 2020/0226041 A1 | 7/2020 | Anderson et al. |

FOREIGN PATENT DOCUMENTS

| | | |
|---|---|---|
| CN | 104040508 A | 9/2014 |
| CN | 106294772 A | 1/2017 |

OTHER PUBLICATIONS

Anonymously; "Record Level Change Tracking Included within a Data Set"; http://ip.com/IPCOM/000239805D; Dec. 2, 2014.
Anonymously; "Optimized Deduplication Metadata Online Redistribution"; http://ip.com/IPCOM/000228925D; Jul. 15, 2013.
IBM; "System, Method and Service for Automated Capacity Expansion of a Data Deduplication Repository"; http://ip.com/IPCOM/000184411D; Jun. 23, 2009.
International Search Report and Written Opinion dated Nov. 21, 2018, for Application PCT IB2018/055378, pp. 9.
English translation of Chinese patent CN106294772 dated Jan. 4, 2017, pp. 10.
English translation of Japanese Office Action dated Oct. 12, 2021, for Application No. Application No. 2020-503906, pp. 3.
Google English Translation of JP 2001-154895A, dated Oct. 28, 2021, pp. 22.
Google English Translation of JP2006252239A, dated Oct. 28, 2021, pp. 17.
Google English Translation of JPH08221210A , dated Oct. 28, 2021, pp. 28.
U.S. Appl. No. 15/662,186, filed Jul. 27, 2017.
U.S. Appl. No. 15/666,525, filed Aug. 1, 2017.

(56) References Cited

OTHER PUBLICATIONS

U.S. Appl. No. 15/688,763, filed Aug. 28, 2017.
U.S. Appl. No. 15/662,205, filed Jul. 27, 2017.
U.S. Appl. No. 15/694,704, filed Sep. 1, 2017.
U.S. Appl. No. 15/662,194, filed Jul. 27, 2017.
Office Action dated Mar. 22, 2019, pp. 20, for U.S. Appl. No. 15/662,194.
Response dated Jun. 22, 2019, pp. 15, to Office Action dated Mar. 20, 2019, pp. 20, for U.S. Appl. No. 15/662,194.
Final Office Action dated Sep. 12, 2019, pp. 19, for U.S. Appl. No. 15/662,194.
Amendment dated Nov. 8, 2019, pp. 12, to Final Office Action dated Sep. 12, 2019, pp. 19, for U.S. Appl. No. 15/662,194.
Notice of Allowance dated Nov. 29, 2019, pp. 13, for U.S. Appl. No. 15/662,194.
Notice of Allowance2 dated Feb. 20, 2020, pp. 12, for U.S. Appl. No. 15/662,194.
U.S. Appl. No. 16/836,827, filed Mar. 31, 2020.
Preliminary Amendment dated Mar. 31, 2020, pp. 9.
Office Action dated Jun. 24, 2021, pp. 43, for U.S. Appl. No. 16/836,827.
Response dated Sep. 19, 2021, pp. 14, to Office Action dated Jun. 24, 2021, pp. 43, for U.S. Appl. No. 16/836,827.
Final Office Action dated Oct. 15, 2021, pp. 11, for U.S. Appl. No. 16/836,827.
Response dated Nov. 28, 2021, pp. 9, to Final Office Action dated Oct. 15, 2021, pp. 11, for U.S. Appl. No. 16/836,827.
Notice of Allowance dated Jan. 5, 2022, pp. 14, for U.S. Appl. No. 16/836,827.
U.S. Appl. No. 15/662,200, filed Jul. 27, 2017.
Office Action dated Feb. 7, 2019, pp. 24, for U.S. Appl. No. 15/662,200.
Response dated May 5, 2019, pp. 12, to Office Action dated Feb. 7, 2019, pp. 24, for U.S. Appl. No. 15/662,200.
Notice of Allowance dated Aug. 21, 2019, pp. 20, for U.S. Appl. No. 15/662,200.
Notice of Allowance dated Jan. 10, 2020, pp. 13, for U.S. Appl. No. 15/662,200.
RCE and Amendment dated Mar. 16, 2020, pp. 14, for U.S. Appl. No. 15/662,200.
Response dated Oct. 20, 2020, pp. 15, to Office Action dated Jul. 20, 2020, pp. 18, for U.S. Appl. No. 15/662,200.
Final Office Action dated Jan. 28, 2021, pp. 18, for U.S. Appl. No. 15/662,200.
Response dated Mar. 27, 2021, pp. 15, to Final Office Action dated for U.S. Appl. No. 15/662,200.
Office Action dated Nov. 15, 2021, pp. 29, for U.S. Appl. No. 15/662,200.
U.S. Appl. No. 15/672,460, filed Aug. 9, 2017.
Office Action dated Jun. 20, 2019, pp. 51, for U.S. Appl. No. 15/672,460.
Response dated Sep. 20, 2019, pp. 11, to Office Action dated Jun. 20, 2019, pp. 51, for U.S. Appl. No. 15/672,460.
Final Office Action dated Dec. 31, 2019, pp. 57, for U.S. Appl. No. 15/672,460.
AFCP and Amendment filed Mar. 10, 2020, pp. 12, to Final Office Action dated Dec. 31, 2019, pp. 57, for U.S. Appl. No. 15/672,460.
Notice of Allowance dated Apr. 8, 2020, pp. 14, for U.S. Appl. No. 15/672,460.
Office Action dated Oct. 2, 2020, pp. 15, for U.S. Appl. No. 15/672,460.
Response dated Jan. 3, 2021, pp. 11, to Office Action dated Oct. 2, 2020, pp. 15, for U.S. Appl. No. 15/672,460.
Notice of Allowance dated Feb. 8, 2021, pp. 14, for U.S. Appl. No. 15/672,460.
U.S. Appl. No. 15/672,470, filed Aug. 9, 2017.
Office Action dated Oct. 12, 2018, pp. 40, for U.S. Appl. No. 15/672,470.
Response dated Jan. 17, 2022, pp. 1-15, to Office Action, pp. 1-29, for U.S. Appl. No. 15/662,200.
Final Office Action dated May 12, 2022, pp. 1-23, for U.S. Appl. No. 15/662,200.
Chinese Search Report and Office Action dated Feb. 23, 2023, for Application No. 201880048427.5, pp. 1-3.
Anonymous, "Format Management of Bitwise Volume Storage", IP.com No. IPCOM000204670D, Mar. 9, 2011, 6 pp.
Anonymous, "Scalable Metadata for AIX Logical Volume Manager", IP.com No. IPCOM000202155D, Dec. 6, 2010, 2 pp.
Devulapalli, A., et al., "Integrating Parallel File Systems with Object-Based Storage Devices", Proceedings of the 2007 ACM/IEEE conference on Supercomputing, Nov. 2007, 10 pp.
IBM Corporation, "DFSMS Using Data Sets", Version 2, Release 3, Updated Jan. 14, 2019, 754 pp.
Yamazaki, T., et al., "Enterprise Storage Solutions", IBM Rebook, Dec. 1999, 376 pp.
Appendix P, Related Art for 17649797, 2 pages, Apr. 24, 2023.
Response dated Jan. 14, 2019, pp. 10, to Office Action dated Oct. 12-18, 2019, pp. 40, for U.S. Appl. No. 15/672,470.
Supplemental Amendment dated Jan. 25, 2019, pp. 8, to Office Action dated Oct. 12-18, 2019, pp. 40, for U.S. Appl. No. 15/672,470.
Final Office Action dated May 9, 2019, pp. 38, for U.S. Appl. No. 15/672,470.
RCE, Response dated Jul. 11, 2019, pp. 12, to Final Office Action dated May 9, 2019, pp. 38, for U.S. Appl. No. 15/672,470.
Notice of Allowance dated Sep. 5, 2019, pp. 22, for U.S. Appl. No. 15/672,470.
Notice of Allowance dated Dec. 17, 2019, pp. 15, for U.S. Appl. No. 15/672,470.
Application for U.S. Appl. No. 16/472,832, dated Jan. 14, 2020.
Preliminary Amendment for U.S. Appl. No. 16/472,832, dated Jan. 14, 2020.
Office Action dated Oct. 20, 2020, pp. 52 for U.S. Appl. No. 16/472,832.
Response dated Dec. 21, 2020, pp. 12, to Office Action dated Oct. 20, 2020, pp. 52 for U.S. Appl. No. 16/472,832.
Notice of Allowance dated Oct. 20, 2020, pp. 25 for U.S. Appl. No. 16/472,832.
List of IBM Patents or Patent Applications Treated as Related, pp. 2, dated Feb. xx, 2022.
Office Action dated Jul. 20, 2020, pp. 18, for U.S. Appl. No. 15/662,200.

* cited by examiner

USING A TRACK FORMAT CODE IN A CACHE CONTROL BLOCK FOR A TRACK IN A CACHE TO PROCESS READ AND WRITE REQUESTS TO THE TRACK IN THE CACHE

BACKGROUND OF THE INVENTION

1. Field of the Invention

The present invention relates to a computer program product, system, and method for using a track format code in a cache control block for a track in a cache to process read and write requests to the track in the cache.

2. Description of the Related Art

In a storage environment, a host system may communicate a read/write request to a connected storage system over network channel through a network adaptor. If the data is in a cache of the storage system, i.e., a read hit, then the data may be returned quickly to the host system. This reduces the delay in returning requested data to a host I/O request. However, if the requested data is not in the cache of the storage system, then there may be significant latency realized while the storage system needs to retrieve the requested data from storage to return. Further, the thread or task executing the host read request may have to be context switched and deactivated in order to allow the host system to process further I/O requests. When the data is returned to the read request, then the task must be reactivated and data for the task must be returned to registers and processor cache to allow processing of the returned data for the read request.

There is a need in the art for improved techniques for processing host read/write requests to the cache.

SUMMARY

In a first embodiment, provided are a computer program product, system, and method for using a track format code in a cache control block for a track in a cache to process read and write requests to the track in the cache. A track format table associates track format codes with track format metadata, wherein each of the track format metadata indicates a layout of data in a track. A track is staged from the storage into the cache and track format metadata for the track staged into the cache is processed. A determination is made as to whether the track format table has track format metadata matching the track format metadata of the track staged to the cache. A determination is made as to whether a track format code from the track format table for the track format metadata in the track format table matches the track format metadata of the track staged into the cache in response to the track format table having the matching track format metadata. A cache control block for the track being added to the cache is generated including the determined track format code when the track format table has the matching track format metadata.

With the first embodiment, a track format code is added to the cache control block for a track in the cache to use to determine the track layout and format when processing the track in the cache by looking up the track format metadata for the track format code in the track format table. This provides fast access to the track format metadata for a track in cache without having to read and process track metadata for the track from the storage. This fast access to the track format metadata substantially reduces the latency for processing read and write requests because reading track metadata to determine the track format metadata is a substantial component of read/write processing latency.

In a second embodiment, the first embodiment may additionally include that a read or write request to a target track is received from the host on a first channel connecting to the host. A determination is made as to whether the target track is in the cache. A determination is made as to whether the cache control block for the target track includes a valid track format code from the track format table in response to determining that the target track is in the cache. The read or write request is failed in response to determining that the target track is not in the cache or determining that the cache control block does not include a valid track format code. The failing the read or write request causes the host to resend the read or write request to the target track on a second channel connecting to the host.

With the second embodiment, if the read or write request is received on a channel requiring fast response time, such as if the request is sent on a bus interface where the host thread for the read/write request is spinning on the request while waiting for a response, the request is failed if there is no valid track format code for the track in the cache. If there is no valid track format code, then the response will not be able to satisfy time requirements for a fast access channel because the track metadata will need to be accessed to determine the track format. However, if there is a valid track format code, then the request can be responded to within the timing requirements for the fast channel because there will be minimal latency to determine the track format metadata from the track format table using the track format code in the cache control block.

In a third embodiment, the second embodiment may additionally include a first channel that provides faster processing of the read or write request than the second channel.

With the third embodiment, the track format table allows fast processing for the fast channel by providing the track format codes to use to determine the track format metadata for a track.

In a fourth embodiment, the second embodiment may additionally include that a read or write request to the target track is received on a second channel connected to the host after failing the read or write request for the target track when the target track is not in the cache. At least one of the operations of the staging the target track into the cache, the processing the track format metadata, the determining whether the track format table has the matching track format metadata, the determining the track format code, and the generating the cache control block are performed in response to receiving the read or write request on the second channel.

With the fourth embodiment, if the request on the fast channel is failed because there is no valid track format code for the target track in the cache control block, then the request is resent on a slower second channel where the host thread managing the I/O request would have context switched because of the expected longer time for the request response on the second channel. In such case, when the request is received on the slower channel, then the request will be processed when there is no valid track format code for the target track, which will require at least one of staging the target track into cache and reading the track metadata to determine track format metadata, which may be used to determine the track format code to include in the cache control block to reduce latency for future requests toward the track.

In a fifth embodiment, the second embodiment may additionally include that a read or write request to the target track is received on the second channel connected to the host after failing the read or write request for the target track having the cache control block that includes an invalid track format code. In response to receiving the read or write request on the second channel when the cache control block for the target track does not have a valid track format code, track format metadata is read for the target track to process the read or write request received on the second channel. A determination is made as to whether the track format table has track format metadata matching the read track format metadata. A determination is made of a track format code from the track format table for the matching track format metadata in response to the track format table having the matching track format metadata. The determined track format code is included in the cache control block for the target track as a valid track format code.

With the fifth embodiment, when the request for the target track is received on the slower second channel after failing the request on the faster first channel, the track format metadata is then read and a track format code determined and included in the cache control block to allow for fast processing of the read/write request on the second channel for future requests to the target track, so that the track format metadata can be quickly determined without having to read track metadata from storage for future requests.

In a sixth embodiment, the first embodiment may additionally include that the cache control block includes a valid flag indicating whether the cache control block includes a valid track format code. The valid flag is set to valid when adding the track format code to the cache control block. A write to update a track in the cache is received when there is a cache control block for the track to update in the cache including a track format code. A determination is made as to whether the update to the track modifies a track format. The valid flag is set to indicate invalid in response to determining that the update to the track modifies the track format.

With the sixth embodiment, a valid track format code is used to indicate whether the track format code in a cache control block is valid. This flag is set to invalid when the track format is changed by a write operation, because in such circumstance the track format code in the cache control block no longer accurately represents the track format of the track, which was changed by the update. The valid track format code provides information that allows for a fast determination of whether the cache control block includes a valid track format code that can be used to process the read or write request.

In a seventh embodiment, provided are a computer program product, system and method for managing read and write requests from a host to tracks in storage cached in a cache. A track format table associated track format codes with track format metadata, wherein each of the track format metadata indicates a layout of data in a track. In cache control blocks for tracks in the cache, at least one cache control block of the cache control blocks include one of the track format codes in the track format table indicating the track format metadata for the track. A read or write request to a target track is received from the host in the cache. A determination is made as to whether the cache control block for the target track includes a valid track format code. The track format metadata is determined for the valid track format code from the track format table in response to determining that the cache control block includes the valid track format code. The determined track format metadata is used to process the read or write request to the target track in the cache.

With the seventh embodiment, when the cache control block for a target track includes a valid track format code, then the track format metadata for the target track can be quickly determined from the track format table without having to read the track metadata from the storage. This use of the track format table substantially reduces the latency in processing read and write requests to target tracks.

In an eighth embodiment, provided are a computer program product, system and method for managing read and write requests from a host to tracks in storage cached in a cache. A track format table associates track format codes with track format metadata, wherein each of the track format metadata indicates a layout of data in a track. A read or write request to a target track in the cache is received from the host on one of a first channel and a second channel connecting to the host. A determination is made as to whether a cache control block for the target track includes a valid track format code in the track format table. The read or write request is failed in response to determining that the cache control block does not include the valid track format code when the read or write request is received on the first channel. The track format metadata for the valid track format code is determined from the track format table in response to determining that the cache control block includes the valid track format code. The determined track format metadata is used to process the read or write request to the target track in the cache.

With the eight embodiment, if the read/write request is received on the channel requiring fast processing, then the request is failed if the cache control block for the target track does not include the track format code because the latency introduced by having to read the track metadata will not allow the request on the first channel to complete within a required time. However, if the cache control block includes a valid track format code, then the request on the first channel can be processed because the response can be returned within the required time for the first channel when the track format metadata can be determined from the track format table.

DETAILED DESCRIPTION

Figure 1:
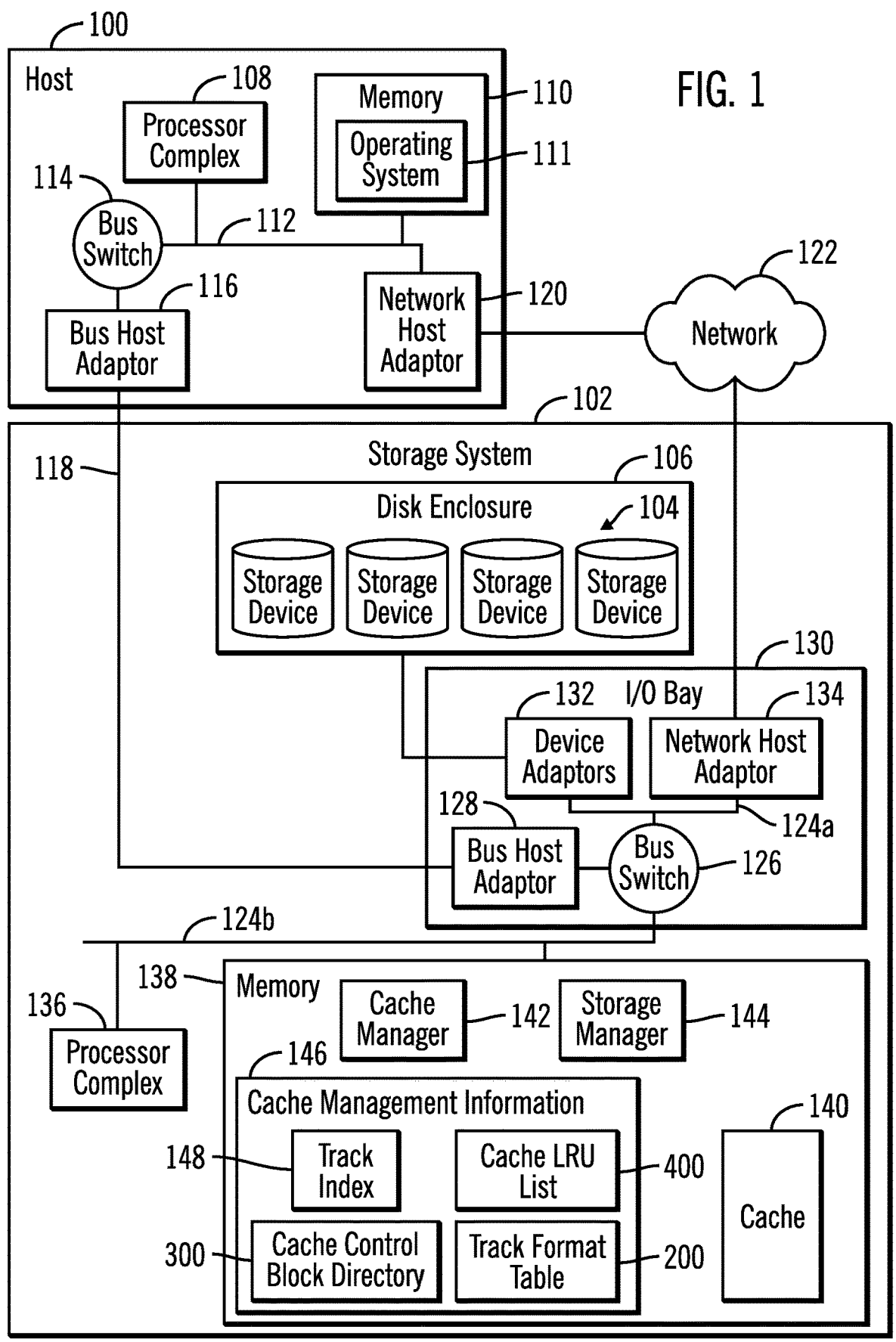
FIG. 1 illustrates an embodiment of a storage environment.

In a storage environment, a host system may first communicate a read/write request to a connected storage system over a fast channel, such as a bus interface, such as the Peripheral Component Interconnect Express (PCIe) interface. For a read/write request over the fast channel which is supposed to complete within a threshold time, the host system holds the application thread for the read/write request in a spin loop waiting for the request to complete. This saves processor time associated with a context swap, which deactivates the thread and reactivates the thread in response to an interrupt when a response to the read/write request is received. If the data for the read/write request sent on the fast channel is not in cache, then the storage system may fail the read/write request and the host system may communicate the same read/write request over a storage area network via a host adaptor, which is slower than processing the I/O request over the bus, e.g., PCIe interface. Communicating the read/write request over the second channel requires the host system to perform a context switch from the task handling the read/write request to another task while waiting for the read/write request to complete. Context switching is costly because it requires the processor running the task to clear all registers and L1 and L2 caches for the new task, and then when completing the new task, reactivate the context switched task and return the state data to the registers and L1 and L2 caches for the task that was context switched while waiting for the read/write request to complete.

Certain read/write operations need to be completed within a threshold time, else they are failed. The storage system will have to access track metadata to process a request to a track. The track metadata provides information on the format of data and layout of records in the track that are needed in order to perform reads and writes to the track. However, the reading of the track metadata from the storage comprises a substantial portion of the latency in processing read/write request. Described embodiments provide improvements to cache technology that reduce cache operation latency by including a track format code in the cache control block for a track in the cache. This track format code may be used for fast access to the track format from a track format table without having to read the track metadata from storage. By eliminating the need to read the track metadata from a metadata track in storage to determine the track layout, described embodiments increase the likelihood that read/write requests on the first channel that need to be completed within a threshold time are completed by accessing the track layout information for a track from the track format table, associating track format codes with track format information for common track formats.

With described embodiments, a read/write request to a target track on a channel requiring that the request be completed within a threshold time is processed if the track format code for the target track is within the cache control block for the target track. Using the track format code to access the track format metadata from the track format table reduces the latency of access to the track format metadata to allow the read/write request to complete within the time threshold. This keeps the time the host thread is spinning on the read/write request task for the read/write request sent on the bus interface within an acceptable time threshold. However, if the cache control block for the target track does not have a valid track format code, then the read/write request on the first channel is failed because it is unlikely the read/write request can complete within the threshold time given that the track format metadata will have to be retrieved from the storage. Failing the read/write request on the first channel, causes the host to redrive the read/write request on the second channel. The processing of the read/write request on the second channel reads in the track metadata from the storage to allow for processing the read/write request and adding the track format code to the cache control block for the target track.

FIG. 1 illustrates an embodiment of a storage environment in which a host 100 directs read and write requests to a storage system 102 to access tracks in volumes configured in storage devices 104 in a disk enclosure 106. The host 100 includes a processor complex 108 of one or more processor devices and a memory 110 including an operating system 111 executed by the processor complex 108. The host operating system 111 generates read and write requests to tracks configured in the storage devices 104. The host 100 includes hardware to communicate read and write requests on two different channels. A first channel is a bus interface, such as a Peripheral Component Interconnect Express (PCIe), including a bus 112, a bus switch 114 to connect one or more devices on the bus 112, including the processor complex 108, a memory system 110, and a bus host adaptor 116 to extend the bus interface over an external bus interface cable 118 to the storage system 102. Additional bus interface technology to extend the bus interface may be utilized, including PCIe extender cables or components, such as a distributed PCIe switch, to allow PCIe over Ethernet, such as with the ExpEther technology. A second channel to connect the host 100 and storage system 102 uses a network host adaptor 120, connected to the bus 112, that connects to a separate network 122 over which the host 100 and storage system 102 additionally communicate. The first channel through the bus interface may comprise a faster access channel than the network 122 interface through the network host adaptor 120.

The storage system 102 includes a bus interface comprising a bus 124a, 124b, a bus switch 126 to connect to endpoint devices on the bus 124a, 124b, and a bus host adaptor 128 to connect to the external bus interface cable 118 to allow communication over the bus interface to the host 100 over the first channel. The storage system 102 includes an Input/Output bay 130 having the bus host adaptor 128, one or more device adaptors 132 to connect to the storage devices 104, and one or more network host adaptors 134 to connect to the network 122 and host systems.

The storage system 102 includes a processor complex 136 of one or more processor devices and a memory 138 having a cache 140 to cache tracks accessed by the connected hosts 100. The memory 138 includes a cache manager 142 and a storage manager 144. The storage manager 144 manages access requests from processes in the hosts 100 and storage system 102 for tracks in the storage 104. The devices 136, 138, 128, 132, and 134 connect over the bus interface implemented in the bus lanes 124a, 124b and bus switch 126.

The cache manager 142 maintains accessed tracks in the cache 140 for future read access to the tracks to allow the accessed tracks to be returned from the faster access cache 140 instead of having to retrieve from the storage 104. Further, tracks in the cache 140 may be updated by writes. A track may comprise any unit of data configured in the storage 104, such as a track, Logical Block Address (LBA), etc., which is part of a larger grouping of tracks, such as a volume, logical device, etc.

The cache manager 142 maintains cache management information 146 in the memory 138 to manage read (unmodified) and write (modified) tracks in the cache 140. The cache management information 146 may include a track format table 200 having track format codes for common track format descriptors providing details of a layout and format of data in a track; track index 148 providing an index of tracks in the cache 140 to cache control blocks in a control block directory 300; and a Least Recently Used (LRU) list 400 for tracks in the cache 140. The control block directory 300 includes the cache control blocks, where there is one cache control block for each track in the cache 140 providing metadata on the track in the cache 140. The track index 148 associates tracks with the cache control blocks providing information on the tracks in the cache 140. Upon determining that the cache LRU list 400 is full or has reached a threshold level, tracks are demoted from the LRU list 400 to make room for more tracks to stage into the cache 140 from the storage 104.

In certain embodiments, there may be multiple hosts 100 that connect to the storage system 102 over the first and second channels to access tracks in the storage devices 104. In such case, the storage system 102 would have at least one bus host adaptor 128 to connect to the bus interface 118 of each connected host 100 and one or more network host adaptors 134 to connect to the network host adaptors 120 on the hosts 100.

In one embodiment, the bus interfaces 112, 114, 116, 118, 124a, 124b, 126, and 128 may comprise a Peripheral Component Interconnect Express (PCIe) bus interface technology. In alternative embodiments, the bus interfaces 112, 114, 116, 118, 124a, 124b, 126, and 128 may utilize suitable bus interface technology other than PCIe. The bus host adaptors 116 and 128 may comprise PCIe host adaptors that provide the interface to connect to the PCIe cable 118. The network 122 may comprise a Storage Area Network (SAN), a Local Area Network (LAN), a Wide Area Network (WAN), the Internet, an Intranet, etc., and the network host adaptors 120, 134 provide the network 122 connections between the hosts 100 and storage system 102.

The storage system 102 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world). The host operating system 111 may comprise an operating system such as Z Systems Operating System (Z/OS®) from International Business Machines Corporation ("IBM") or other operating systems known in the art. (Z/OS is a registered trademark of IBM throughout the world).

The storage devices 104 in the disk enclosure 106 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 104 in the disk enclosure 106 may comprise heterogeneous storage devices from different vendors and different types of storage devices, such as a first type of storage devices, e.g., hard disk drives, that have a slower data transfer rate than a second type of storage devices, e.g., SSDs.

Figure 2:
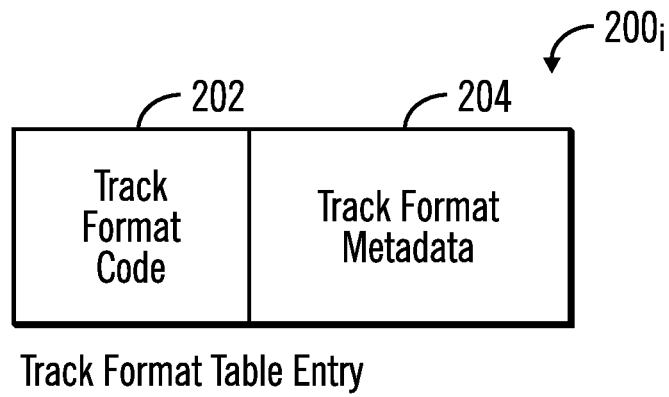
FIG. 2 illustrates an embodiment of a track format table entry.

FIG. 2 illustrates an embodiment of a track format table entry $200_i$ in the track format table 200, which includes a track format code 202 and the track format metadata 204. In certain embodiments Count Key Data (CKD) track embodiments, the track format metadata 204 may comprise a track format descriptor (TFD) indicating a number of records in the track, a block size, a number of blocks in the track, a data length of each of the records, and a control interval size indicating an amount of data that is read or written atomically as a unit, number of blocks in a control interval, and whether a control interval spans two tracks, and other information. The track format code 202 may comprise an index value of the index entry $200_i$ in the track format table 200. For instance, if there are 32 track format table entries $200_i$, then the track format code 202 may comprise 5 bits to reference the different possible number of 32 entries $200_i$.

Figure 3:
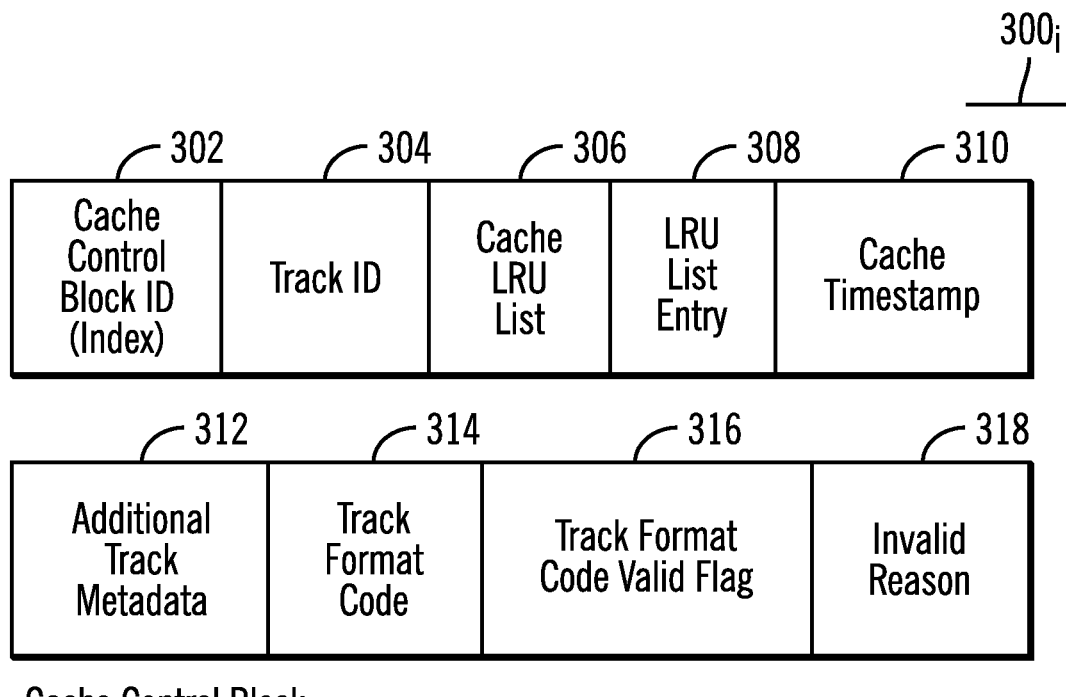
FIG. 3 illustrates an embodiment of a cache control block.

FIG. 3 illustrates an embodiment of a cache control block $300_i$ for one of the tracks in the cache 140, including, but not limited to, a cache control block identifier 302, such as an index value of the cache control block $300_i$; a track ID 304 of the track in the storage 104; the cache LRU list 306 in which the cache control block $300_i$ is indicated; an LRU list entry 308 at which the track is indicated; a cache timestamp 310 indicating a time the track was added to the cache 140 and indicated on the LRU list 306; additional track metadata 312 typically maintained for tracks stored in the cache 140, such as a dirty flag indicting whether the track was modified; a track format code 314 comprising one of the track format codes 202 of the track format metadata 204 describing the layout of data in the track 304 represented by the cache control block $300_i$; a track format code valid flag 316 indicating whether the track format code 314 is valid or invalid; and an invalid reason 318 indicating a reason for the track format code valid flag 316 code being invalid, as indicated in the track format code valid flag 316.

Figure 4:
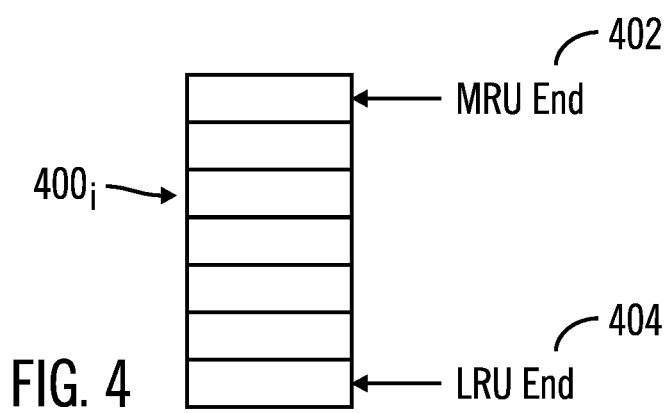
FIG. 4 illustrates an embodiment of a Least Recently Used (LRU) list of tracks in the cache.

FIG. 4 illustrates an embodiment of an LRU list $400_i$, such as having a most recently used (MRU) end 402 identifying a track most recently added to the cache 140 or most recently accessed in the cache 140 and a least recently used (LRU) end 404 from which the track identified at the LRU end 404 is selected to demote from the cache 140. The MRU end 402 and LRU end 404 point to track identifiers, such as a track identifier address or a cache control block index for the track, of the tracks that have been most recently added and in the cache 140 the longest, respectively, for tracks indicated in that list 400.

Figure 5:
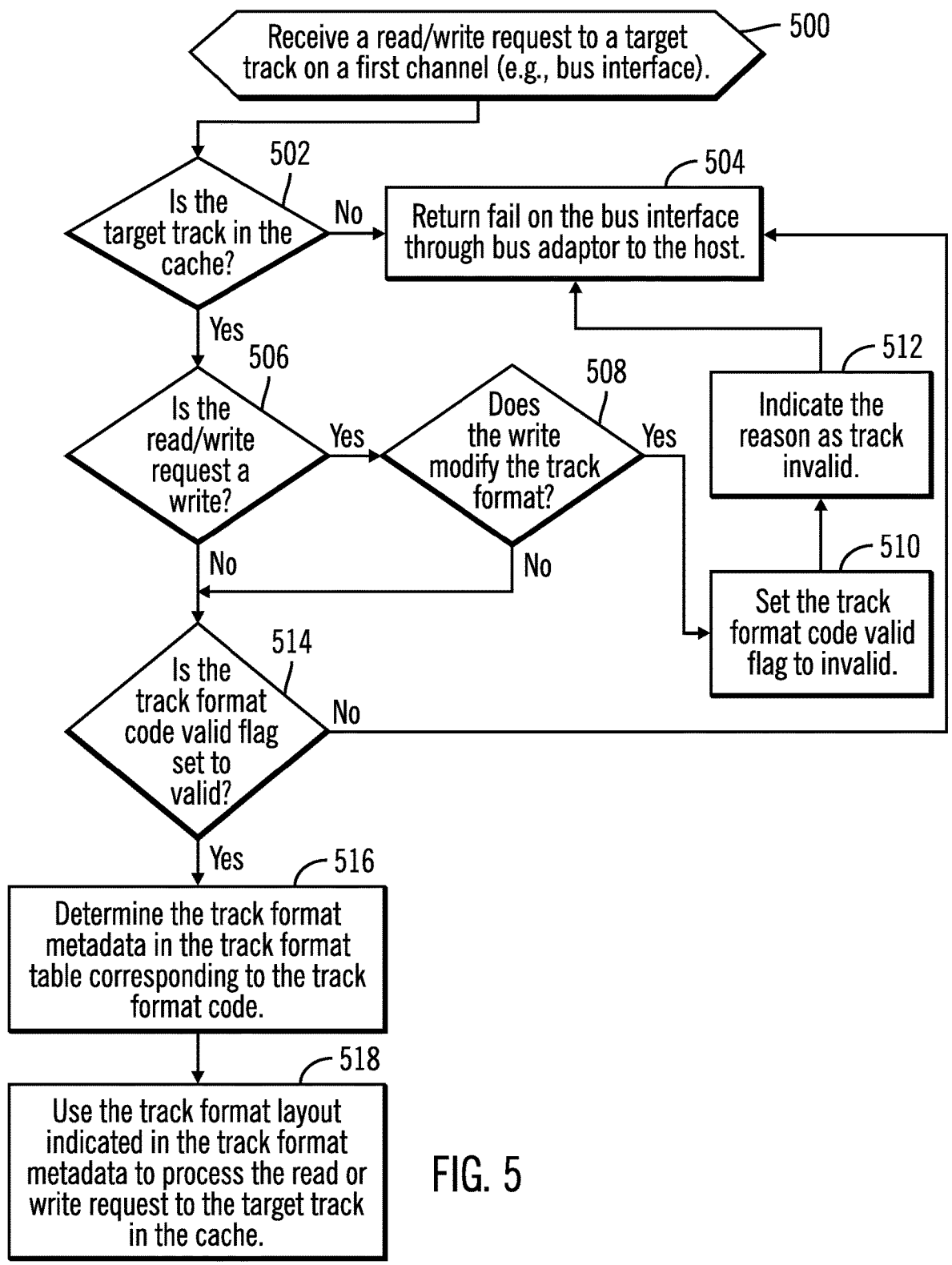
FIG. 5 illustrates an embodiment of operations to process a read/write request received on a first channel, such as a bus interface.

FIG. 5 illustrates an embodiment of operations performed by the cache manager 142 and storage manager 144 to process a read/write request to a target track received on a first fast channel, such as the PCIe bus interface via bus host adaptor 128. Upon receiving (at block 500) the read/write request at the bus host adaptor 128, if (at block 502) the target track is not in the cache 140, then the storage manager 144 returns (at block 504) fail to the read/write request on the first channel or bus host adaptor 128 to the host 100, which causes the host 100 to retry the read/write request on the second channel or network host adaptor 120, 134. Failure is returned because if the target track is not in the cache 140, then the target track and track metadata needs to be staged into cache 140, which would likely exceed the time threshold for read/writes on the first channel, where the host processor is spinning on the thread of the read/write request. If (at block 502) the target track is in the cache 140 is a write and if (at block 508) the write modifies the track format, then the cache manager 142 sets (at block 510) the track format code valid flag 316 to invalid and indicates (at block 512) the invalid reason 318 that the track in the cache 140 was invalidated as track format change. The storage manager 144 then returns (at block 504) fail to the host 100 because the track metadata needs to be read from the storage 104 to update with the modified track format.

If (at block 506) the read/write request is a read or if (at block 508) the request is a write that does not modify the track format, then the cache manager 142 determines (at block 514) if the track format code valid flag 316 is set to valid. If so, then the cache manager 142 determines (at block 516) the track format metadata 204 in the track format table 200 corresponding to the track format code 314 in the cache control block 300$_i$. The cache manager 142 uses (at block 518) the track format layout indicated in the determined track format metadata 204 to process the read or write request to the target track in the cache 140. If the request is a write, a dirty flag 312 in the cache control block 300$_i$ may be set to indicate the track is modified. If (at block 514) the track format code valid flag 316 is invalid, meaning there is no fast access to track format information available through the track format code 314, then the storage manager 144 returns (at block 504) fail on the bus interface to the bus host adaptor 128 because the track format table 200 cannot be used, and the track metadata needs to be read from the storage 104, which would introduce too much latency for the fast read/write on the first channel.

With the embodiment of operations of FIG. 5, during a fast write over the bus interface or first channel, if the track format metadata may be accessed without latency through the track format table 200, then the read/write request is allowed to proceed when the transaction can be processed very quickly because the track metadata can be obtained directly from the track format table 200 through the track format code 314, without having to read the track metadata from storage 104. However, if the cache control block 300$_i$ does not have a valid track format code 314 to allow low latency access of track format metadata, then the read/write request is failed because the transaction will not likely complete within a fast time threshold. This determination is important to avoid host delays in processing other tasks while the host processor is spinning on the thread handling the read/write request while waiting for the read/write request to complete. If the track metadata can be accessed from the track format table 200 than there is a high likelihood the read/write can complete on the bus interface channel within the time required to avoid the host processor holding the thread for too long, which causes other I/O requests to be queued and delayed. If the track metadata cannot be accessed from the track format table 200 and needs to be read from the storage 104, then it is unlikely the read/write request will complete within the time threshold for the host processor to spin on the thread for the read/write request, and failure is returned. Returning failure when the track metadata cannot be obtained from the track format table 200 causes the host thread waiting on the read/write request task to be deactivated and the host processor may context switch to processing other tasks, and then the read/write request is retried on the second network channel during the context switch.

Figure 6:
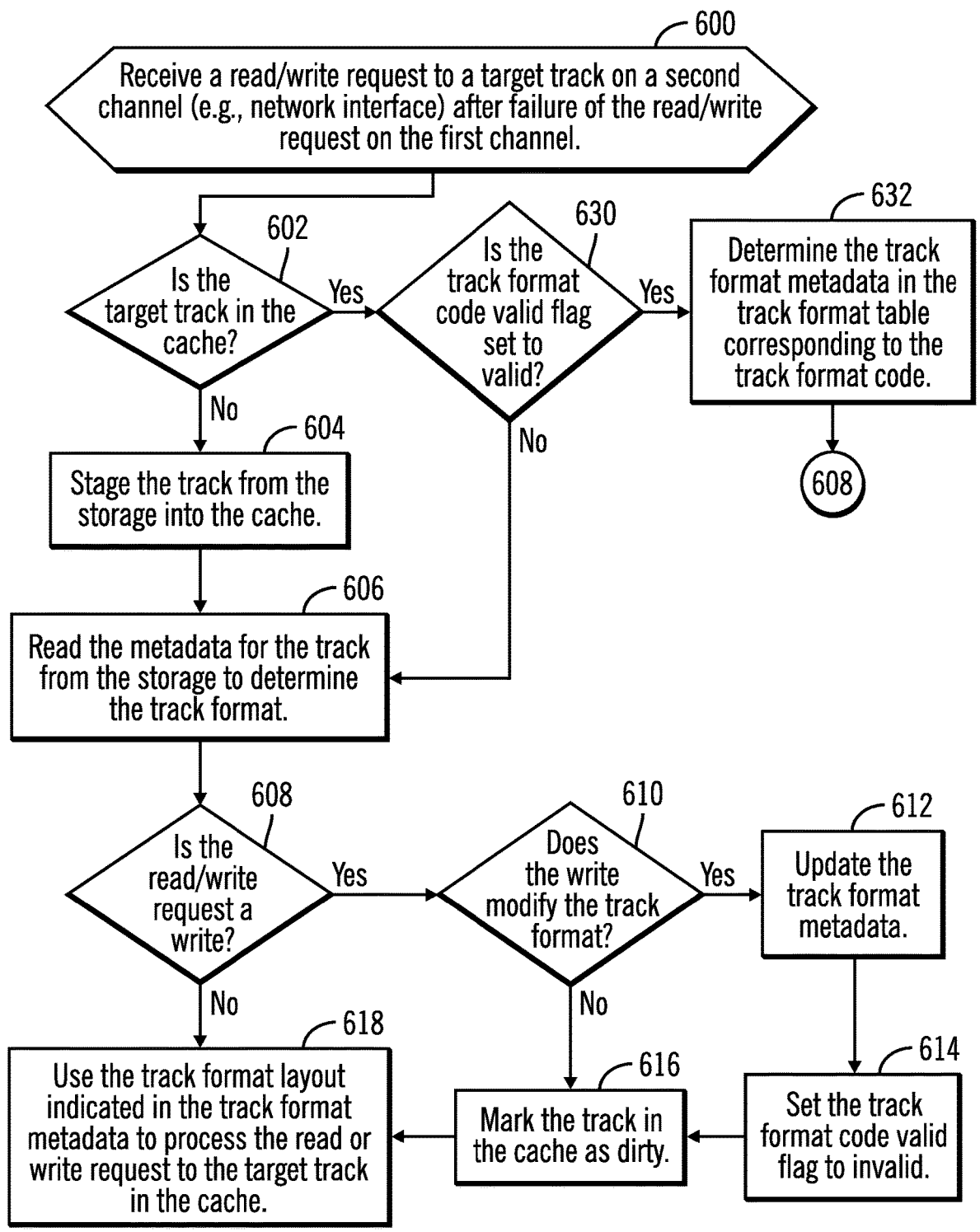
FIG. 6 illustrates receive an embodiment of operations to process a read/write request received on a second channel, such as a network.

FIG. 6 illustrates an embodiment of operations performed by the cache manager 142 and storage manager 144 to process a read/write request to a target track received on a second channel, such as the network 122 on network host adaptor 134. Upon receiving (at block 600) the read/write request, if (at block 602) the target track is not in the cache 140, then the cache manager 142 stages (at block 604) the track from the storage 104 to the cache 140 and reads (at block 606) the track metadata for the target track from the storage 104 to determine the track format, e.g., size of blocks, control interval, layout of records on the track, etc. If (at block 608) the read/write request is a write and if (at block 610) the write modifies the track format, then the cache manager 142 updates (at block 612) the track metadata to indicate the modified track format and sets (at block 614) the track format code valid flag 316 to invalid. The track metadata 312 is further updated (at block 616) to indicate the track is modified or dirty. If (at block 608) the request is a read or from block 616, the cache manager 142 uses (at block 618) the track format layout indicated in the track format metadata to process the read or write request to the target track in the cache 140.

If (at block 602) the target track is in the cache 140 and if (at block 630) the track format code valid flag 316 is set to valid, then the cache manager 142 determines (at block 632) the track format metadata 204 in the track format table 200 corresponding to the track format code 314 in the cache control block 300$_i$ for the target track. From block 632, control proceeds to block 608 to process the read/write request. If (at block 630) the track format code valid flag 316 is set to invalid, then control proceeds to block 606 to read the metadata for the track form the storage 104 to determine the track format layout.

With the embodiment of FIG. 6, when the read/write request is received on the second slower channel, such as over the network 122, where the host operating system 111 would have performed a context switch for the thread handling the read/write request, the cache manager 142 may read the track metadata from the storage 104 to determine the track layout to process the request. During this time, the host processing of further host requests is not delayed because the host thread handling the read/write request is context switched and not active, until the read/write request returns complete.

Figure 7:
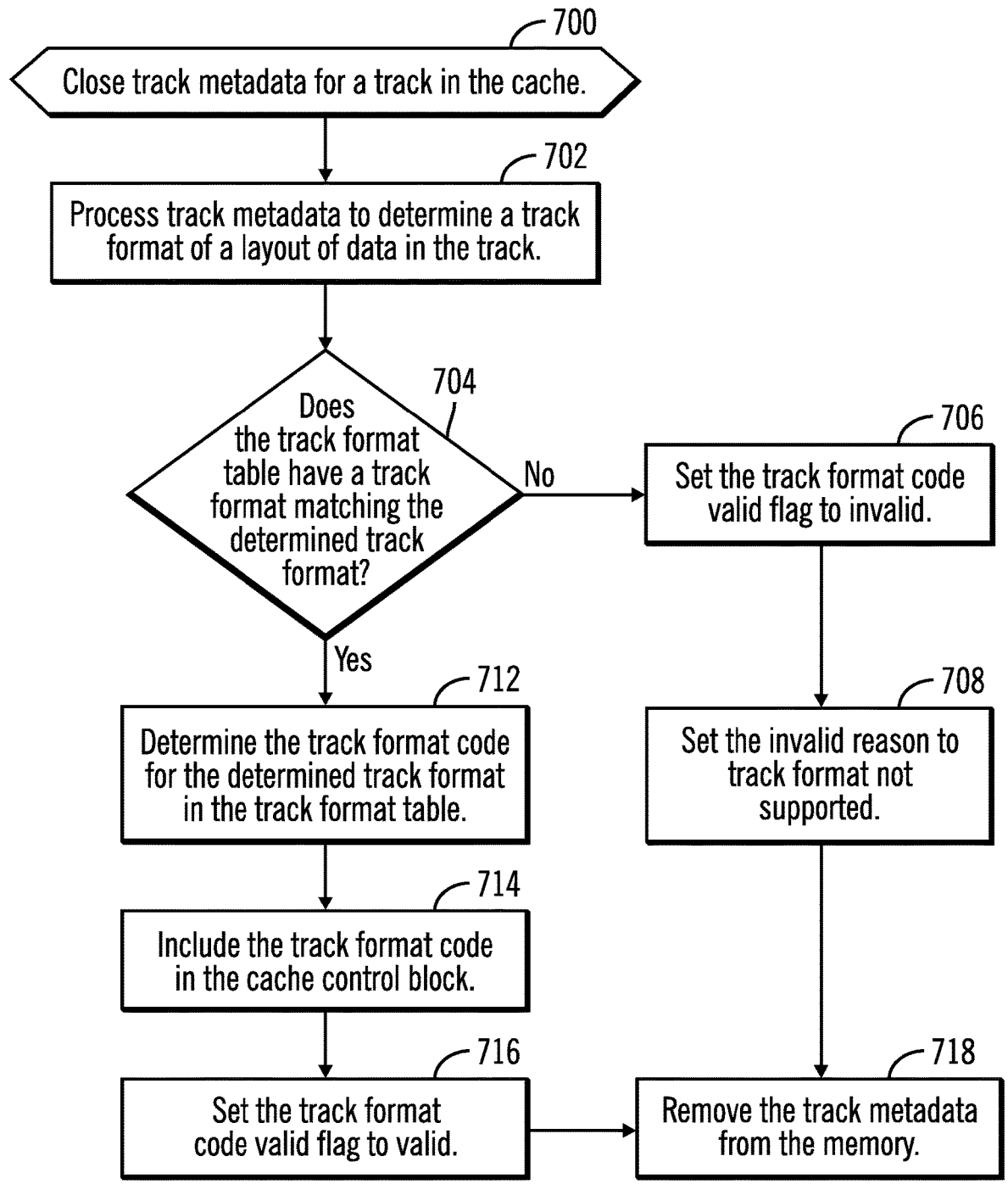
FIG. 7 illustrates an embodiment of operations to close track metadata and determine a track format code for the track in cache of the closed track metadata.

FIG. 7 illustrates an embodiment of operations performed by the cache manager 142 when closing the track metadata for a track in the cache 140, which involves destaging the track metadata to the storage 104 if changed. Upon closing (at block 700) the track metadata for a track in the cache 140, the cache manager 142 processes (at block 702) the track metadata to determine a track format or a layout of data in the track. If (at block 704) the track format table 200 does not have a track format metadata 204 matching the determined track format from the track metadata, which may happen if the determined track format is irregular, then the track format code valid flag 316 is set (at block 706) to invalid and the invalid reason 318 is set to indicate that the track format is not supported. In such situation, read/write requests to the track having an irregular format are only processed when received through the second channel via network host adaptor 134.

If (at block 704) the track format table has a track format metadata 204 matching the determined track format from the track metadata, then the cache manager 142 determines the track format code 202 for the determined track format metadata 204 in the track format table 200 and includes the track format code 202 in the field 314 in the cache control block 300$_i$. The track format code valid flag 316 is set (at block 716) to valid. From block 708 or 716, control proceeds to block 718 to destage the track metadata from the memory 138 if modified or discard if not modified.

With the operations of FIG. 7, the track format information may be indicated in the cache control block 300$_i$ with a track format code 202 having a limited number of bits to index track format metadata 204 describing track layout in a track format table 200, where the track metadata itself would not fit into the cache control block $300_i$. For future read/write accesses, if a valid track format code 314 is provided, then the cache manager 142 may use that code 314 to obtain with low latency the track format metadata 204 from the track format table 200 without having to read the track metadata from the storage 104 and process to determine the track format.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
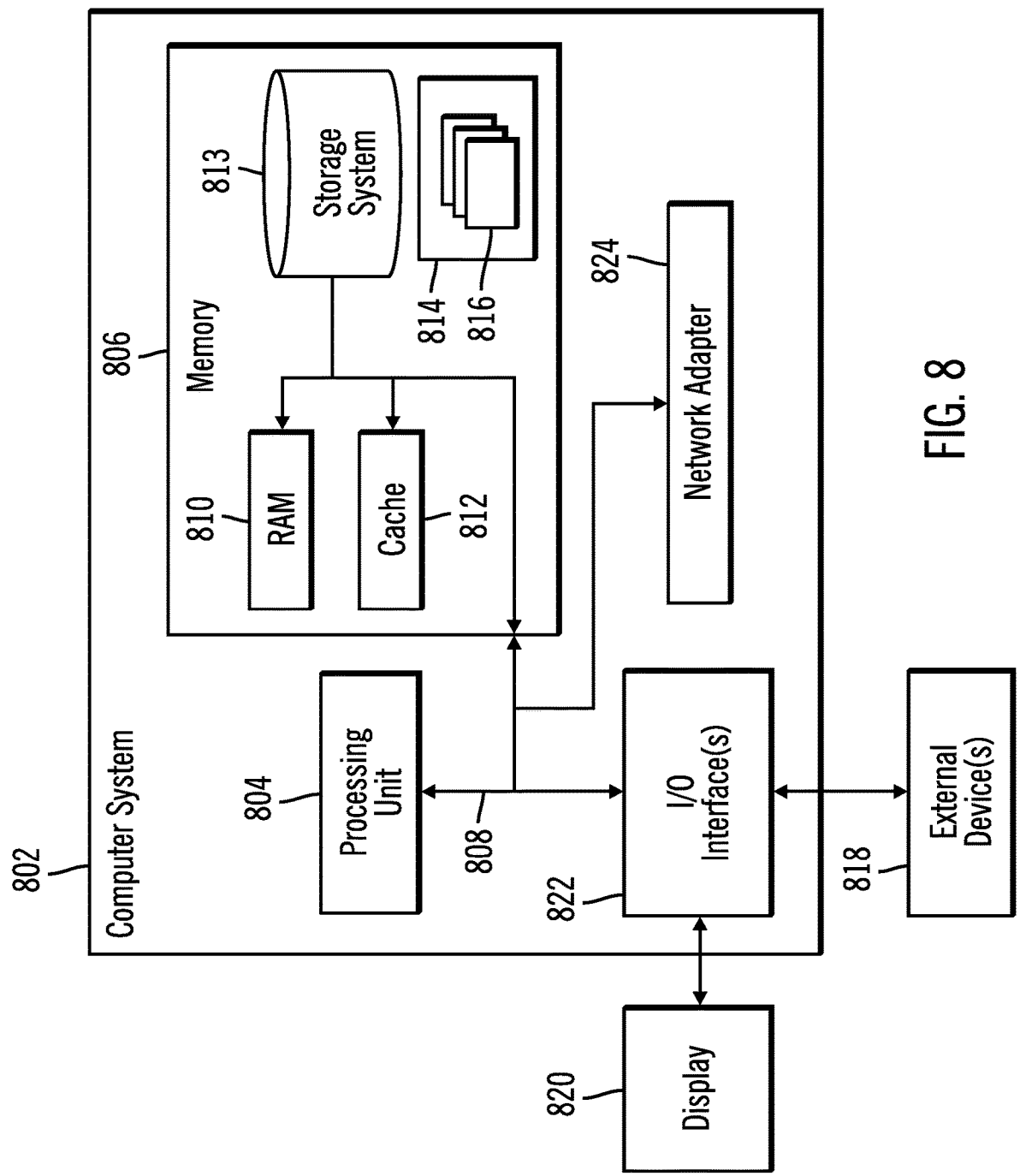
FIG. 8 illustrates an embodiment of a computer architecture used with described embodiments.

The computational components of FIG. 1, including the host 100 and storage system 102 may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing read and write requests from a host to tracks in storage cached in a cache, the computer program product comprising a computer readable storage medium having computer readable program code embodied therein that is executable to perform operations, the operations comprising:
    maintaining a track format table including track format codes to associate with track format metadata, wherein instances of the track format metadata indicate layouts of data in tracks;
    including track format codes from the track format table in cache control blocks for tracks in the cache to indicate the track format metadata for the tracks; and
    failing a request to a track in response to determining that a cache control block for the requested track does not include a valid track format code.

2. The computer program product of claim 1, wherein the operations further comprise:
    failing the request to the requested track in response to determining that the requested track is not in the cache.

3. The computer program product of claim 1, wherein the cache control blocks include track format code valid flags indicating whether the track format codes in the cache control blocks are valid or invalid, wherein the operations further comprise:
    failing the request to the requested track in response to determining that there is a cache control block for the requested track and a track format code valid flag in the cache control block that indicates a track format code for the requested track is invalid.

4. The computer program product of claim 1, wherein the cache control blocks include track format code valid flags indicating whether the track format codes in the cache control blocks are valid or invalid, wherein the operations further comprise:
    setting a track format code valid flag in a cache control block for a track in the cache in response to closing track metadata and determining that there is a track format code for a track format of the track in the closed track metadata; and
    setting the track format code valid flag to indicate invalid in response to an update to a track modifying a track format of the updated track.

5. The computer program product of claim 1, wherein the cache control blocks include track format code valid flags indicating whether the track format codes in the cache control blocks are valid or invalid, wherein the operations further comprise:
    setting invalid reason bits in a cache control block in response to a write request to modify a format of a track.

6. The computer program product of claim 1, wherein the request for the requested track comprises a first request and is failed in response to the first request sent on a first channel, wherein the operations further comprise:
    receiving a second request for the requested track on a second channel after failing the first request on the first channel;
    staging the requested track into the cache in response to the second request and determining that the requested track is not in the cache; and
    reading metadata for the requested track to determine a track format of the requested track staged into the cache to process the request in response to the request comprising a read request.

7. The computer program product of claim 1, wherein the request for the requested track comprises a first request and is failed in response to the first request sent on a first channel, wherein the operations further comprise:
    receiving a second request for the requested track on a second channel after failing the first request on the first channel;
    staging the requested track into the cache in response to determining that the requested track is not in the cache and in response to the second request; and
    indicating the track format code in the cache control block as invalid in response to a write request on the second channel that modifies a track format of the requested track staged into the cache.

8. A system for managing read and write requests from a host to tracks in storage, comprising:
    a processor;
    a cache to cache tracks from the storage;
    a computer readable storage medium having computer readable program code embodied therein that is executable to perform operations, the operations comprising:
        maintaining a track format table including track format codes to associate with track format metadata, wherein instances of the track format metadata indicate layouts of data in tracks;
        including track format codes from the track format table in cache control blocks for tracks in the cache to indicate the track format metadata for the tracks; and
        failing a request to a track in response to determining that a cache control block for the requested track does not include a valid track format code.

9. The system of claim 8, wherein the operations further comprise:
    failing the request to the requested track in response to determining that the requested track is not in the cache.

10. The system of claim 8, wherein the cache control blocks include track format code valid flags indicating whether the track format codes in the cache control blocks are valid or invalid, wherein the operations further comprise:
    failing the request to the requested track in response to determining that there is a cache control block for the requested track and a track format code valid flag in the cache control block that indicates a track format code for the requested track is invalid.

11. The system of claim 8, wherein the cache control blocks include track format code valid flags indicating whether the track format codes in the cache control blocks are valid or invalid, wherein the operations further comprise:
    setting a track format code valid flag in a cache control block for a track in the cache in response to closing track metadata and determining that there is a track format code for a track format of the track in the closed track metadata; and
    setting the track format code valid flag to indicate invalid in response to an update to a track modifying a track format of the updated track.

12. The system of claim 8, wherein the cache control blocks include track format code valid flags indicating whether the track format codes in the cache control blocks are valid or invalid, wherein the operations further comprise:
    setting invalid reason bits in a cache control block in response to a write request to modify a format of a track.

13. The system of claim 8, wherein the request for the requested track comprises a first request and is failed in response to the first request sent on a first channel, wherein the operations further comprise:
    receiving a second request for the requested track on a second channel after failing the first request on the first channel;
    staging the requested track into the cache in response to the second request and determining that the requested track is not in the cache; and
    reading metadata for the requested track to determine a track format of the requested track staged into the cache to process the request in response to the request comprising a read request.

14. The system of claim 8, wherein the request for the requested track comprises a first request and is failed in response to the first request sent on a first channel, wherein the operations further comprise:
    receiving a second request for the requested track on a second channel after failing the first request on the first channel;
    staging the requested track into the cache in response to determining that the requested track is not in the cache and in response to the second request; and
    indicating the track format code in the cache control block as invalid in response to a write request on the second channel that modifies a track format of the requested track staged into the cache,
    maintaining a track format table including track format codes to associate with track format metadata, wherein instances of the track format metadata indicate layouts of data in tracks;
    including track format codes from the track format table in cache control blocks for tracks in cache to indicate the track format metadata for the tracks; and
    failing a request to a track in response to determining that a cache control block for the requested track does not include a valid track format code.

15. A method for managing read and write requests from a host to tracks in storage cached in a cache, comprising:
    maintaining a track format table including track format codes to associate with track format metadata, wherein instances of the track format metadata indicate layouts of data in tracks;
    including track format codes from the track format table in cache control blocks for tracks in the cache to indicate the track format metadata for the tracks; and
    failing a request to a track in response to determining that a cache control block for the requested track does not include a valid track format code.

16. The method of claim 15, further comprising:
    failing the request to the requested track in response to determining that the requested track is not in the cache.

17. The method of claim 15, wherein the cache control blocks include track format code valid flags indicating whether the track format codes in the cache control blocks are valid or invalid, further comprising:
    failing the request to the requested track in response to determining that there is a cache control block for the requested track and a track format code valid flag in the cache control block that indicates a track format code for the requested track is invalid.

18. The method of claim 15, wherein the cache control blocks include track format code valid flags indicating whether the track format codes in the cache control blocks are valid or invalid, further comprising:
    setting a track format code valid flag in a cache control block for a track in the cache in response to closing track metadata and determining that there is a track format code for a track format of the track in the closed track metadata; and
    setting the track format code valid flag to indicate invalid in response to an update to a track modifying a track format of the updated track.

19. The method of claim 15, wherein the cache control blocks include track format code valid flags indicating whether the track format codes in the cache control blocks are valid or invalid, further comprising:
    setting invalid reason bits in a cache control block in response to a write request to modify a format of a track.

20. The method of claim 15, wherein the request for the requested track comprises a first request and is failed in response to the first request sent on a first channel, further comprising:
    receiving a second request for the requested track on a second channel after failing the first request on the first channel;
    staging the requested track into the cache in response to the second request and determining that the requested track is not in the cache; and
    reading metadata for the requested track to determine a track format of the requested track staged into the cache to process the request in response to the request comprising a read request.

* * * * *